Dec. 8, 1942.  D. E. STEARNS  2,304,513
APPARATUS FOR DETECTING IMPERFECTIONS IN INSULATING MATERIALS
Filed April 8, 1940
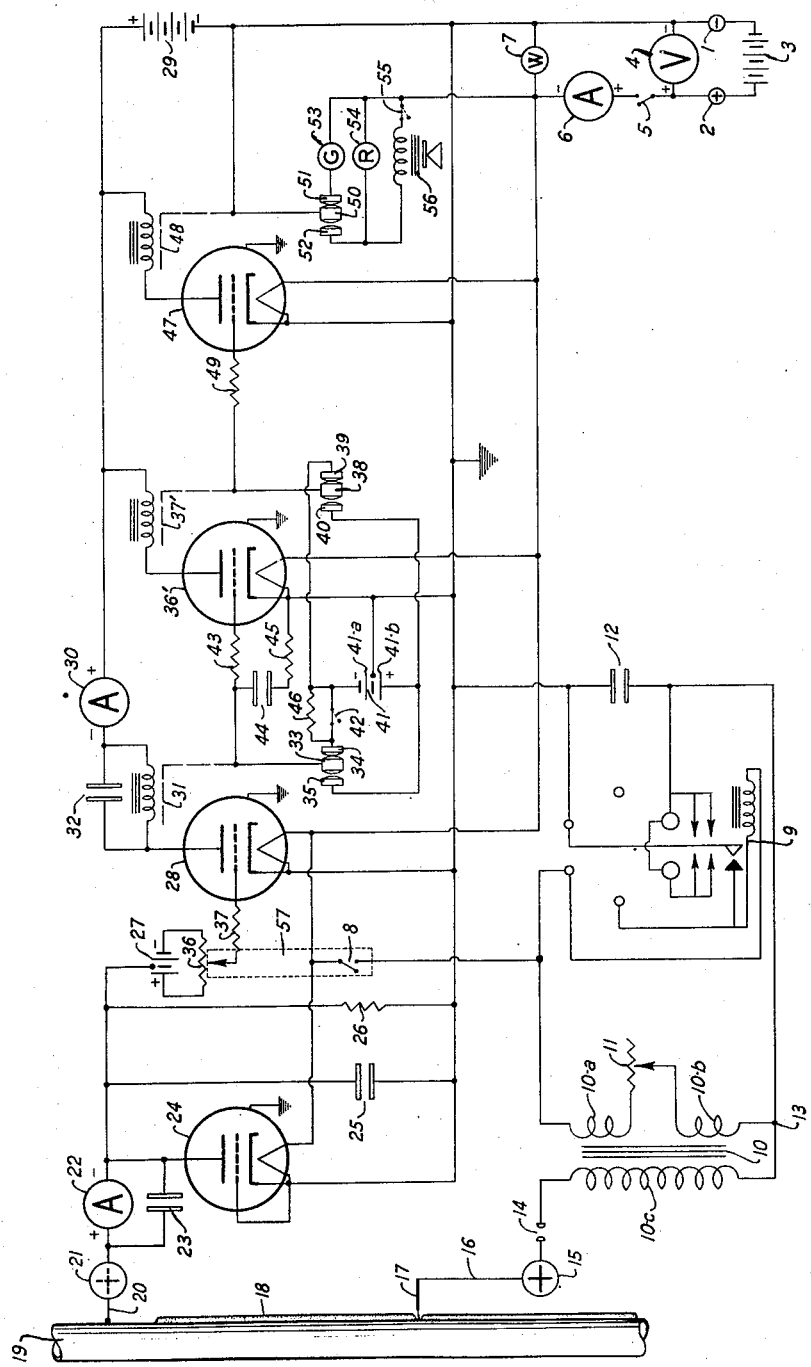
INVENTOR.
Dick E. Stearns
BY
ATTORNEYS Patented Dec. 8, 1942

2,304,513

UNITED STATES PATENT OFFICE 2,304,513

APPARATUS FOR DETECTING IMPERFECTIONS IN INSULATING MATERIALS

Dick E. Stearns, Shreveport, La.

Application April 8, 1940, Serial No. 328,480

11 Claims. (Cl. 175—183)

This invention relates to electrical testing apparatus and has for its general object the provision of an electric testing apparatus which will provide an efficient means for testing insulating materials.

The particular problem to which this invention has been applied is that of testing insulating coatings such as employed on pipe lines and the like.

In protecting pipe lines from corrosion one method heretofore used has been that of coating the pipe with an insulating material so as to prevent the flow from the pipe of any electric current. When a perfect insulating coating is provided, this of course prevents any electrolysis of the pipe and damage to the pipe resulting therefrom. However, if the coating is imperfect and breaks down at a point, any electric current which may be induced to flow from the pipe due to electrolysis at the given location will be concentrated at that point and will be of much greater value than would the electric current flowing at the given point were there no coating whatever. This concentrated current flow very quickly would produce a hole in the pipe. It is therefore highly important that all defects in the insulating coating of such pipes be detected and corrected.

For the purpose of detecting such defects there has been employed in the past a high voltage circuit one terminal of which is grounded to the pipe and the other terminal of which is in the form of an electrode, which encircles the pipe and is movable along the pipe. As this electrode is moved along the pipe a spark or arc occurs whenever any defects in the insulation is encountered. However, it is many times impossible to see such a spark because it may be of very slight intensity and may occur for only a fraction of a second. Also, it may occur on the opposite side of the pipe from the observer and it may occur at such a point as to be hidden from the observer by the movable electrode. Inasmuch as such tests are necessarily conducted in many instances in bright sunlight, the visibility of any such spark will of course be greatly reduced thereby. Some reliance has been placed on the observer's ability to detect the sound produced by the spark but this is unsatisfactory because many times a spark would produce very little or no sound, and the conditions under which the testing is necessarily done in many instances would make it impossible because of other and louder noises to detect the sound of a spark.

It is an object of the present invention to provide an apparatus for the purpose set forth which will produce with certainty either clearly visible or clearly audible signals or both whenever the movable electrode encounters any defect in the insulating coating.

Another object of this invention is to provide such a device in which the strength of the signals produced by a relatively slight defect will be substantially as great as the strength of the signals produced by a defect which would cause a substantial short circuit of the device.

Another object of this invention is to provide an apparatus of the type set forth in which slight fluctuations of the current flowing when a slight defect is encountered will not be transmitted to the signalling device, but in which such signalling device or devices will give a positive and steady signal instead of a fluttering or fluctuating signal.

Another object of this invention is to provide an apparatus of the type set forth in which the signalling device or devices may be caused to operate for a substantial period of time following an instantaneous flow of current through a defect in an insulating coating.

Other objects and advantages of this invention will become apparent from the following description taken in connection with the accompanying drawing.

In the drawing the single figure illustrates diagrammatically the electrical parts and circuits of a device constructed in accordance with this invention.

Referring more particularly to the drawing, the numerals 1 and 2 indicate the negative and positive poles respectively of a main current source 3 which may be in the form of a battery. Such current source may have a voltage range from 5 to 8 volts in this example.

Connected across the terminals 1 and 2 is a volt meter 4 for indicating the voltage produced by the current source 3, and a master switch 5 is provided for the purpose of connecting or disconnecting the current source 3 from the remainder of the apparatus. An ammeter 6 is connected in the line leading from the current source 3 and a small electric lamp may be connected across the lines from the current source 3 to indicate when the switch 5 is closed and the device in operation. Preferably such electric lamp is clear or white to distinguish it from others later to be described.

The negative line from the battery 3 may be described as the ground of the instrument, and the battery 3 is connected by suitable connections through a switch 8 to a vibrator 9. This vibrator or current interrupter is intended to provide a pulsating current for supplying the transformer 10, this transformer including primary coils 10—a and 10—b and a secondary coil 10—c. The coils 10—a and 10—b are connected in series with each other through a rheostat 11.

The current interrupting device 9 may be of any suitable conventional design and in the present instance consists of a heavy duty vibrator having a frequency of 60 cycles per second. The rheostat 11 has a power carrying capacity of 25 watts and a resistance of the order of 15 ohms.

An electric condenser 12 having a capacity of the order of $\frac{1}{10}$ of a microfarad and a safe working voltage of the order of 600 volts D. C. is connected across the contact points of the current interrupting device 9 for the purpose of reducing to a minimum the arcing and burning of the contact points of the current interrupter as they make and break the current supply to the transformer. It will be appreciated that this current interrupter will provide two impulses per cycle or in other words it will supply a pulsating direct current of 120 surges per second to the transformer 10.

The primary coil 10—b and secondary coil 10—c of the transformer 10 are connected together and to the contact points of the current interrupter at 13.

A spark gap 14 of the order of 1 millimeter is provided in the other lead from the secondary coil 10—c which leads to the high voltage terminal 15, in order to avoid any detrimental results which might be occasioned in the event of an accidental or intended short in the high voltage inspection circuit external of the instrument. In the example being described, the open circuit voltage produced in the secondary coil of the transformer 10 will be in the neighborhood of 10,000 volts when the power supply from the battery 3 is of 6 volts potential.

A suitable highly insulated conductor 16 leads from the high voltage terminal 15 of the device to the exploring electrode 17 which travels over the exterior of the insulating coating 18 on the pipe 19. It will be understood that this insulating coating as applied to a pipe will extend over the entire surface of the pipe and that the exploring electrode 17 may be of annular form.

A second suitable electrical conductor 20 is adapted to be connected to the metal of the pipe 19 and to connect the same with the intermediate ground terminal 21 of the instrument being described. Connected to this intermediate ground terminal 21 is an ammeter 22 having a range of 0 to 10 milliamperes, and in parallel with this ammeter is a condenser 23 having a capacity of 0.0001 microfarads and a safe working voltage of the order of 600 volts D. C. Both the ammeter 22 and the condenser 23 have their free terminals connected to the plate (anode) of the thermionic tube 24, to one terminal of the condenser 25, to one terminal of the resistor 26, and to an intermediate point on the battery 27. The thermionic tube 24 is of the type known as the 6J5 three element thermionic tube having an indirectly heated cathode requiring a warming up period of approximately twenty seconds. The shield of this tube is grounded as shown and for the purposes of this instrument the grid thereof is connected to the cathode externally of the tube. The condenser 25 has a capacity of ¼ microfarad and a safe working voltage of the order of 600 volts D. C. The resistor 26 has a power carrying capacity of one watt and a resistance of 1,000,000 ohms. The battery 27 which serves as the grid bias for a second thermionic tube 28 in this case consists of a 45 volt dry cell battery having a center tap.

The purpose of the condenser 23 is merely to smooth out possible fluctuations of the ammeter 22 which might otherwise occur from the pulsating direct current such as flows in the high voltage inspection circuit. Likewise, the purpose of the condenser 25 is to smooth out to some extent the pulsations of the voltage applied across the plate and cathode of the tube 24. The resistor 26 serves as an electrical connection between the center tap of the battery 27 and the cathode of the tube 28 so as to complete the grid circuit of said tube while at the same time substantially preventing the flow of any considerable amount of current in said circuit.

The purpose of the tube 24 is to control the voltage drop across the resistor 26 while permitting the flow of such current in the testing circuit of the device as would be caused either by a very small defect or by a substantial short circuit. The problem is one of providing a means which will give a voltage drop of the order of 1 or 2 volts when an extremely slight current is flowing due to a very small defect in the insulating material, but which will provide a voltage drop not greatly exceeding 2 volts when a much larger current is flowing such as under conditions of substantial short circuit in the inspection circuit. It has been found that the use of a thermionic tube such as that described and shown at 24 will provide such a control when the grid is externally connected to the cathode. It will be understood that the voltage drop just referred to serves to vary the bias on the grid of the tube 28 and that it is desirable that it be of the order of from 1 to 2 volts for this purpose. The tube 24 acts as a sort of differential relief valve for the current flowing in the high voltage inspection circuit and allows a relatively large amount of current to flow in the testing circuit with very little greater voltage drop across resistance 26 than when a relatively small amount of current is flowing in the testing circuit.

Thus, tube 24, condenser 25, and resistance 26 serve to produce a substantially constant voltage drop across resistance 26 for widely varying values of current flowing in the testing circuit, and the voltage drop across resistance 26 serves to effect in the plate circuit of the tube 28 a current which varies only within relatively small limits but which flows constantly when there is a current in the testing circuit, and which is reduced to an ineffective value when the current in the testing circuit becomes substantially zero. Most of the currents which will flow in the testing circuit in ordinary use will be relatively small, but the effects of these small currents are increased in value by the amplifiers 28, 36' and 47.

The thermionic tube 28 is of the same type as the tube 24. To the plate of this tube is connected a battery 29 which is preferably 90 volts potential and may be furnished by two 45 volt dry cell batteries. This battery 29 is connected to the plate of the tube 28 through an ammeter 30 having a range of 0 to 5 milliamperes and through a relay 31 which is of a type adapted to be actuated by one milliampere direct current. This relay, however, is in this instance adjusted by suitable adjusting means so that it will not close until there is a current flowing through its coil of approximately 2.5 milliamperes. When so adjusted this relay will open when the current flowing through its coil drops to approximately 1.75 milliamperes. A condenser 32 having a capacity of 0.010 microfarad and a safe working voltage of 600 volts D. C. is connected in parallel with the coil of the relay 31 to assist in smoothing out the pulsating direct current which flows in this circuit, when a defect in the coating is encountered.

The relay 31 is provided with a moving contact 33 and with a contact 34 against which the contact 33 bears when the relay is open and a third contact 35 against which the contact 33 bears when the relay is closed.

Connected across the battery 27 is a conventional potentiometer 36 having a resistance of 500,000 ohms. The movable contact of this potentiometer is connected to the grid of the tube 28 through a resistor 37 having a power carrying capacity of ½ watt and a resistance of the order of 500,000 ohms. This resistor 37 taken with the resistor 26 serves to substantially prevent the flow of current in the grid circuit under any condition during operation. The battery 27 through suitable adjustment of potentiometer 36 merely gives the grid of tube 28 a fixed bias potential sufficiently negative with respect to its cathode so as to cause relay 31 to be de-energized or open when no defect in the coating is being encountered.

The flow of current in the plate circuit of the tube 28 and consequently the flow of current through the coil of the relay 31 will of course be affected by any change in the bias on the grid of the tube 28, and this bias will be influenced by the voltage drop when occurring across the elements of tube 24. The voltage drop or potential across the tube 24 existing when there is a flow of current in the inspection circuit, is superimposed on the fixed negative bias voltage between the grid and cathode of tube 28, and being of the opposite polarity either partially or wholly cancels the fixed negative bias voltage (that is making it less negative) between the grid and cathode, thus allowing the current flowing in the plate circuit of tube 28 to increase sufficiently to energize relay 31 and thereby cause contact 33 to move over and touch contact 35. Because the flow of current in the inspection circuit may be very weak and fluttering, the closed circuit contacts 33 and 35 of the relay 31 may continuously make and break without the movable contact 33 ever coming in contact with the open circuit contact 34 of this relay. In order to transmit this fluttering action of the relay 31 into a steady and positive action, the thermionic tube 36' and the relay 37' are employed. The relay 37' has a movable contact 38, an open contact 39, and a closed contact 40. For the purpose of distinguishing between the relays 31 and 37', the relay 31 will be termed the primary relay and the relay 37' the secondary relay.

The grid of the tube 36' is provided with a bias voltage by means of a 45 volt battery 41 having a center tap dividing this battery into sections 41—a and 41—b. The negative end of the battery section 41—a is connected through a manually controlled switch 42 to the open contact 34 of the relay 31. The movable contact 33 of this relay is connected through a resistor 43 which has a power carrying capacity of one watt and a resistance of 3500 ohms to the grid of the tube 36'. An electrolytic condenser 44 having a capacity of 20 microfarads and a safe working voltage of the order of 50 volts D. C. is connected in series with another resistor 45 having a power carrying capacity of one watt and a resistance of the order of 40 ohms. This condenser 44 and resistor 45 are connected between the cathode of the tube 36' and the line leading from the resistor 43 to the movable contact 33.

Shunted across the switch 42 is a resistor 46 having a power carrying capacity of one watt and a resistance of the order of 1,000,000 ohms.

It will be seen that with the switch 42 closed and the relay 31 open the battery 41—a will provide a negative bias of 22½ volts on the grid of the tube 36'. When the relay 31 is closed by he passage of a current through a break in the insulation 18, this bias on the grid of the tube 36' will be suddenly changed to a positive bias of 22½ volts because the contact 33 of the relay 31 will swing over from its open position as shown in the drawing to a closed position in contact with the contact element 35. This sudden change in the bias of tube 36' of from 22½ volts negative between grid and cathode to 22½ volts positive between grid and cathode will cause the current flow from battery 29 through tube 36' and consequently relay 37' to increase instantly from zero to several milliamperes and will thus cause contact 38 to immediately move from its open position against contact 39 to its closed position against contact 40 and forcefully remain in such position against contact 40 until the grid of tube 36' is again made 22½ volts negative with respect to its cathode. The grid of the tube 36' being now positive with respect to the cathode of this tube, let it be assumed that slight interruptions occur in the current passing through the break in the insulation 18. These slight interruptions will cause momentary deenergization of the relay 31 and will cause it to break the contact momentarily between the points 33 and 35. However, if these interruptions are of very short duration, the contact 33 will not have time to swing over against the contact 34 and thus change the bias on the grid of the tube 36', but will merely make and break contact with the element 35. During this making and breaking of contact the bias on the grid 36' will be maintained by virtue of the condenser 44, which is bridged across between the grid and the cathode of this tube. The charging and discharging of this condenser will be retarded by resistor 45, such retardation while resulting in a charging and discharging time of the order of hundreths of seconds, is made necessary in order to prevent the welding of contact points. By virtue of this arrangement, therefore, the grid of the tube 36' will be continuously subjected to a positive charge even during momentary interruptions of the leakage in the inspection circuit. Of course, if the interruption is of sufficient duration for the element 33 to swing back against the element 34 then the bias on the grid of tube 36' will be immediately changed from 22½ volts positive with respect to its cathode to 22½ volts negative with respect to its cathode. This will cause the relay 37' to open with a snap and allow contact 38 to be held forcefully against contact 39 by the action of the tension spring of relay 37' whenever the current is interrupted more than momentarily, but will cause contact 38 to remain forcefully closed against contact 40 so long as the current in the inspection circuit is not interrupted long enough for the relay 31 to move to full open position.

It is within the contemplation of this invention that the relay 37' may be used directly to control visual or audible signals so as to indicate to the operator any leakage in the inspection circuit. However, it is desirable in some instances that the sensible signals referred to continue in duration for a period of time after the actual interruption of the leakage in the inspection circuit. For this purpose there is provided an additional thermionic tube 47 having a relay 48 connected in its plate circuit. This tube 47, similarly as tubes 28 and 36', has its plate connected through the relay 48 with the battery 29. The grid of the tube 47 is connected to the movable contact 38 of the relay 37' through a resistor 49, this resistor having a power carrying capacity of one watt and a resistance of the order of 3,000 ohms. The tube 47 and the relay 48 are preferably similar in their characteristics to the tubes and relays previously described.

The relay 48 is provided with a movable contact 50 and with contacts 51 and 52 respectively against which the movable contact 50 will lie when the relay 48 is open and closed respectively. Connected in series with the contact 51 is a visible signal in the form of a green light 53 and connected in series with the closed circuit contact 52 is a visible signal in the form of a red light 54. Also connected in series with the closed circuit contact 52 and in series with a manually controlled switch 55 is an audible signal in the form of a horn or bell 56.

Under the circumstances heretofore described, when the relay 37' is operated with the switch 42 closed, the grid of the tube 47 will be subjected to a negative bias of 22½ volts so long as the relay 37' is open, but immediately when the relay 37' is closed the grid of the tube 47 will be subjected to a positive bias of 22½ volts. It will be appreciated that as long as the plate circuit of the tube 36' has sufficient current flowing therein to keep the relay 37' closed with the contact 38 against the contact 40 the grid of the tube 47 will be subjected to a positive bias and there will be current in the plate circuit of the tube 47 to maintain the contact 50 against the contact 52. This will cause the red light 54 to glow and the audible signal 56 to operate. When the grid of the tube 36' has its bias changed to a negative bias as by the contact 33 coming against the contact 34 with the switch 42 closed, the plate current of the tube 36' will immediately drop allowing the relay 37' to snap to open position as shown in the drawing thus immediately reversing the bias on the grid of the tube 47, dropping the current flow in the plate circuit of the tube 47 to zero value, causing the relay 48 to open and thus deenergize the red light 54 and the audible signal 56 and cause the green light 53 to glow.

In the event it is desired to delay the opening of the relay 48 so as to cause the red light 54 to continue to glow and the audible signal 56 to continue to operate after the relay 31 has opened, the switch 42 may be opened. With this switch opened, the bias on the grid of the tube 36' cannot be immediately changed from 22½ volts positive to 22½ volts negative because of the resistance offered to the flow of current from the condenser 44 by means of the resistor 46. Thus, the grid of the tube 36' will continue to be biased positively after relay 31 has opened after having been closed but this bias will gradually be reduced as the charge of condenser 44 leaks through the resistor 46 until it drops to a point of zero bias at which point the current in the plate of this tube will become approximately 4 milliamperes which will continue to hold the relay 37' firmly closed.

As soon as condenser 44 has completely discharged and the bias between the grid and cathode of tube 36' has consequently become zero, battery 41 will immediately begin the charging of condenser 44 with a charge of the opposite polarity, that is in such manner as to cause the grid of tube 36' to be made more and more negative with respect to the cathode. Finally, when condenser 44 has become fully charged the bias will have reached the point where the grid has become 22½ volts negative with respect to the cathode. It is to be appreciated that at some value of negative bias between zero and the condition in which the grid of tube 36' is 22½ volts negative that the plate current of tube 36' will reach a reduced value at which relay 37' will open allowing contact 38 to move from contact 40 to contact 39. However, at the precise instant that contact 38 begins to move away from contact 39 the bearing pressure of the one contact against the other will have just reached a zero value. It is therefore apparent that any current flowing between contact 38 and contact 40 must be of a low value else arcing and resultant burning would occur between these contacts just as they part and thus bring about an unsatisfactory and relatively undependable separation. For this reason the relay 37' cannot be used under these circumstances to directly control the sensible signals 53, 54 and 56. Therefore, in order to furnish a definite on or off control for the sensible signals 53, 54 and 56, tube 47 and relay 48 have been provided, depending upon the contacts 38 and 40 of relay 37' to break only the small grid current which flows from battery 41 when imparting a positive charge to the grid of tube 47. However, even though the relay 37' will be gradually de-energized because of the presence of the resistor 46 in the grid circuit of the tube 36', nevertheless when this relay 37' eventually comes to a full open position with the contact 38 against the contact 39, the grid of the tube 47 will be immediately changed from a positive to a negative bias. This will cause the relay 48 to operate with a snap from closed to open position so that it will be capable of controlling the visual and audible signals 53, 54 and 56.

It will readily be seen that with the switch 42 open and the opening of the relay 37' delayed thereby in the manner just described, the opening of the relay 48 will likewise be delayed and this delay may be made such that it will be in the order of seconds. That is to say, it will be a matter of seconds after the leakage in the inspection circuit of the device has ceased before the red light 54 and the audible signal 56 will be de-energized and the green light 53 will be energized.

In the apparatus above described the thermionic tubes are of the type which will not function until their indirectly heated cathodes have been raised to operating temperature. In order that the device might not be harmed by the possible closing of the high voltage circuit before the cathodes of these tubes reach their operating temperatures, the switch 8 and the movable contact of the rheostat 36 are operated by the same shaft or carrier member 57. This switch and contact are so arranged on the carrier 57 that when the switch 8 is fully open the movable contact will be adjacent the positive end of the rheostat 36 so that the grid of the tube 28 will be given a positive bias.

With the carrier 57 in this position and with the switch 55 open so that the audible signal will not sound when the tubes become heated, the switch 5 is closed. Energy from the battery 3 will now heat the cathodes of the respective tubes. As these cathodes become heated, there will be a flow of current in the plate circuit of the tube 28 because this tube is provided with a positive bias by virtue of the position of the movable contact of the rheostat 36. This flow of current in the plate of the tube 28 will cause a closing of the relay 31 bringing the contact 33 against the contact 35 and giving the grid of the tube 36' a positive bias. This will cause a flow of current in the plate circuit of the tube 36' closing the relay 37' and bringing the contact 38 against the contact 40. This in turn will cause a positive bias on the grid of the tube 47 closing the relay 48, bringing the contact 50 against the contact 52 and causing the red light 54 to glow. At the same time the ammeter 30 will show the flow of current in the plate circuit of the tube 28. These two indicators will show the operator that the cathodes of the respective tubes have been heated so that the high voltage circuit may be energized. The carrier 57 is then moved to close the switch 8 energizing the high voltage circuit, and moving the movable contact of the rheostat 36 to such a position so that the grid of the tube 28 will no longer have its positive bias but will have imparted to it a fixed negative bias between the grid and cathode sufficient to cause a reduction in the plate current of tube 28 to a predetermined value which will result in the opening of relay 31, such predetermined value of plate current being indicated by ammeter 30. The other relays 37' and 48 will then open in a manner readily understood and the green light 53 will glow showing that the device is ready for operation. If it is desirable that the audible and visual signals be energized only during the period when leakage occurs in the high voltage inspection circuit, the switch 42 will be closed, but if it be desired that these signals continue to be energized for a period of time after the leakage is interrupted, the switch 42 will be left open. It will be appreciated also that the switch 55 may be opened if desired whenever the audible signal is not desired to be used.

Although the action of the tube 24 in controlling the voltage drop across its elements as connected into the circuit shown is herein confined to behavior when employing an inspection circuit of high voltage pulsating direct current, its action in affecting the overall performance of the instrument has been found to be equally effective when employing high voltage alternating current in the inspection circuit—such equally effective operation being made possible by virtue of the rectifying properties of tube 24 with its elements connected into the circuit as shown. In other words the electronic circuit as designed need not be limited to use with a direct current source of high voltage but may be used with an alternating current source of high voltage with equal effectiveness.

While one embodiment of this invention has been described by way of illustration and example, it will be appreciated that many variations, substitutions and equivalents may be employed within the scope of the appended claims.

Having described my invention, I claim:

1. In a device of the character described, a high voltage inspection circuit, a means for producing a pulsating high voltage therein, means for deriving from the current flowing in said inspection circuit a voltage varying only within narrow limits upon the flow of a current of any intensity in said inspection circuit, means responsive to said derived voltage for producing a sensible indication of current flowing in said inspection circuit, and a means to cause said indicating means to continue to operate for a limited period of time after the current in said high voltage circuit has ceased to flow.

2. In a device of the character described, a high voltage inspection circuit, a means for producing a pulsating high voltage therein, means for deriving from the current flowing in said inspection circuit a voltage varying only within narrow limits upon the flow of a current of any intensity in said inspection circuit, means responsive to said derived voltage for producing a sensible indication of current flowing in said inspection circuit, and a means for preventing momentary cessations and flutterings of the flow of current in said high voltage circuit from causing perceptible interruptions of said indicating means.

3. In a device of the character described, a high voltage inspection circuit, a means for producing a pulsating high voltage therein, a thermionic tube amplifier for amplifying a current flowing in said circuit, separate means for controlling the heating of the cathodes of the tubes of said amplifier, means for controlling the operation of the high voltage source, means for causing a plate current in one of the tubes of said amplifier when said high voltage source is turned off and the cathode of said tube is at operating temperature, a means providing a sensible indication of such current, and common means for simultaneously turning on said high voltage source and for causing a reduction of said plate current to a value less than that required to actuate said sensible indicator.

4. In a device of the character described, a high voltage inspection circuit, a means for producing a pulsating high voltage therein, a means for causing widely varying current values flowing in said circuit to produce voltage drops varying within narrow limits and not in proportion to such current values, a means for impressing such voltage drops on a thermionic tube amplifier to cause said amplifier to produce a current flow whenever a current flows in said high voltage circuit, and a means for giving a sensible indication of said amplified current flow.

5. In a device of the character described, a high voltage inspection circuit, a means for producing a pulsating high voltage therein, a means for causing widely varying current values in said circuit to produce voltage drops varying within narrow limits and not in proportion to such current values, means for impressing such voltage drops on a thermionic tube amplifier to cause said amplifier to produce a current flow whenever a current flows in said high voltage circuit, said amplifier having two thermionic tubes, and a means in the grid circuit of the second tube for preventing minute interruptions in the plate current of the first tube from appreciably affecting the grid bias of the second tube.

6. In a device of the character described, a high voltage inspection circuit, a means for producing a pulsating high voltage therein, a means for causing widely varying current values flowing in said circuit to produce voltage drops varying within narrow limits and not in proportion to such current values, means for impressing such voltage drops on a thermionic tube amplifier to cause said amplifier to produce a current flow whenever a current flows in said high voltage circuit, said amplifier including two tubes, and a means in the grid circuit of the second tube for positively changing the bias of the grid of said second tube when the plate current of said first tube is interrupted more than momentarily.

7. In a device of the character described, a high voltage inspection circuit, a means for producing a pulsating high voltage therein, a means for causing widely varying current values flowing in said high voltage circuit to produce voltage drops varying within narrow limits and not in proportion to such current values, a means for impressing such voltage drops on a thermionic tube amplifier to cause said amplifier to produce such current flow whenever a current flows in said high voltage circuit, said amplifier consisting of three tubes, a means in the grid circuit of the second tube for gradually changing the bias of the grid of the second tube when the current in the plate circuit of the first tube is interrupted, and a means for positively changing the bias on the grid of the third tube when the plate current in the second tube reaches a predetermined minimum.

8. In an insulation testing device of the character described, a high voltage inspection circuit adapted to include a test piece having insulation thereon and to be closed upon a break down of said insulation, means for producing an impulsive high voltage in said inspection circuit to cause a change in the intensity of current flow in said circuit in the event a relatively weak spot or defect in the insulation on said test piece is encountered, means for deriving from the current flowing in said inspection circuit a voltage varying only within narrow limits upon the flow of a current of any intensity in said inspection circuit, a thermionic vacuum tube amplifier responsive to said derived voltage, and a sensible indicator in the plate circuit of said thermionic tube amplifier adapted to be steadily actuated only during the flow of a current in said test circuit.

9. In an insulation testing device of the character described, a high voltage inspection circuit adapted to include a test piece having insulation thereon and to be closed upon a break down of said insulation, means for producing an impulsive high voltage in said inspection circuit to cause a change in the intensity of current flow in said circuit in the event a relatively weak spot or defect in the insulation on said test piece is encountered, means for deriving from the current flowing in said inspection circuit a voltage varying only within narrow limits upon the flow of a current of any intensity in said inspection circuit, a thermionic vacuum tube amplifier responsive to said derived voltage, a sensible indicator connected to the plate circuit of said amplifier for indicating a flow of current in said test circuit, and means for prolonging the actuation of said sensible indicator for a limited period of time following the cessation of flow of current in said test circuit.

10. In a device of the character described, a high voltage inspection circuit, a means for producing a pulsating high voltage therein, means for deriving from the current flowing in said inspection circuit a voltage varying only within narrow limits upon the flow of a current of any intensity in said inspection circuit, said voltage ceasing when the current flow in said inspection circuit ceases, and means responsive to said derived voltage for producing a sensible indication of current flowing in said inspection circuit.

11. In an insulation testing device of the character described, a high voltage inspection circuit adapted to include a test piece having insulation thereon and to be closed upon a break down of said insulation, means for producing an impulsive high voltage in said inspection circuit to cause a change in the intensity of current flow in said circuit in the event a relatively weak spot or defect in the insulation on said test piece is encountered, means for deriving from the current flowing in said inspection circuit a voltage varying only within narrow limits upon the flow of a current of any intensity in said inspection circuit, said voltage ceasing when the current flow in said inspection circuit ceases, and means responsive to said derived voltage for producing a sensible indication of current flowing in said inspection circuit.

DICK E. STEARNS.